United States Patent
Duluk, Jr. et al.

(10) Patent No.: US 8,823,724 B2
(45) Date of Patent: Sep. 2, 2014

(54) SPARSE TEXTURE SYSTEMS AND METHODS

(75) Inventors: Jerome F. Duluk, Jr., Palo Alto, CA (US); Andrew Tao, San Francisco, CA (US); Bryon Nordquist, Santa Clara, CA (US); Henry Moreton, Woodside, CA (US)

(73) Assignee: Nvidia Corporation, Santa Clara, CA (US)

(*) Notice: Subject to any disclaimer, the term of this patent is extended or adjusted under 35 U.S.C. 154(b) by 1057 days.

(21) Appl. No.: 12/651,192

(22) Filed: Dec. 31, 2009

(65) Prior Publication Data

US 2011/0157206 A1      Jun. 30, 2011

(51) Int. Cl.
| | | |
|---|---|---|
| *G06T 17/00* | (2006.01) | |
| *G06T 15/00* | (2011.01) | |
| *G06T 11/40* | (2006.01) | |
| *G06F 12/02* | (2006.01) | |
| *G09G 5/00* | (2006.01) | |
| *G06K 9/40* | (2006.01) | |
| *G06K 9/36* | (2006.01) | |
| *G06K 9/54* | (2006.01) | |
| *G06T 5/00* | (2006.01) | |
| *G06T 3/40* | (2006.01) | |

(52) U.S. Cl.
CPC ............... *G06T 5/001* (2013.01); *G06T 3/4007* (2013.01)
USPC ........... 345/582; 345/428; 345/587; 345/522; 345/552; 345/544; 382/254; 382/260; 382/274; 382/276; 382/305

(58) Field of Classification Search
USPC ......... 345/418, 423, 428, 581–582, 587, 501, 345/522, 530, 536, 552, 544–545, 548, 556, 345/565; 382/254, 260, 274, 276, 285, 300, 382/305, 307
See application file for complete search history.

(56) References Cited

U.S. PATENT DOCUMENTS

| | | | |
|---|---|---|---|
| 5,945,997 | A | 8/1999 | Zhao et al. |
| 6,618,053 | B1 * | 9/2003 | Tanner .......................... 345/552 |
| 6,778,181 | B1 | 8/2004 | Kilgariff et al. |
| 2006/0107020 | A1 | 5/2006 | Stillwell, Jr. et al. |
| 2008/0106552 | A1 * | 5/2008 | Everitt .......................... 345/552 |
| 2008/0303841 | A1 * | 12/2008 | Newhall, Jr. .................. 345/587 |
| 2010/0122259 | A1 | 5/2010 | Gosalia et al. |
| 2011/0161620 | A1 | 6/2011 | Kaminski et al. |

OTHER PUBLICATIONS

Tao et al.; Application as Filed "Sparse Texture Systems and Methods"; filed Dec. 31, 2009; U.S. Appl. No. 12/651,141.
Hall et al.; Application as Filed "Sparse Texture Systems and Methods"; filed Dec. 31, 2009; U.S. Appl. No. 12/651,228.
Cass W. Everitt; "Virtual Memory Based Sparse Texture Representations"; U.S. Appl. No. 11/556,622, Filed Nov. 3, 2006.

* cited by examiner

*Primary Examiner* — Wesner Sajous

(57) ABSTRACT

Systems and methods for texture processing are presented. In one embodiment a texture method includes creating a sparse texture residency translation map; performing a probe process utilizing the sparse texture residency translation map information to return a finest LOD that contains the texels for a texture lookup operation; and performing the texture lookup operation utilizing the finest LOD. In one exemplary implementation, the finest LOD is utilized as a minimum LOD clamp during the texture lookup operation. A finest LOD number indicates a minimum resident LOD and a sparse texture residency translation map includes one finest LOD number per tile of a sparse texture. The sparse texture residency translation can indicate a minimum resident LOD.

20 Claims, 23 Drawing Sheets

| Texel | LOD | RES | Texel | LOD | RES | Texel | LOD | RES |
|---|---|---|---|---|---|---|---|---|
| 201 | LOD2 | 0 | 241 | LOD2 | 0 | 281 | LOD3 | 0 |
| 202 | LOD2 | 0 | 242 | LOD1 | 0 | 282 | LOD3 | 0 |
| 203 | LOD2 | 0 | 243 | LOD1 | 0 | 283 | LOD3 | 0 |
| 204 | LOD1 | 1 | 244 | LOD0 | 1 | 284 | LOD2 | 0 |
| 205 | LOD2 | 0 | 245 | LOD0 | 0 | 285 | LOD2 | 0 |
| 206 | LOD1 | 1 | 246 | LOD1 | 0 | 286 | LOD2 | 0 |
| 207 | LOD1 | 1 | 247 | LOD1 | 0 | 287 | LOD2 | 0 |
| 208 | LOD1 | 1 | 249 | LOD2 | 1 | 290 | LOD2 | 0 |
| 210 | LOD2 | 0 | 250 | LOD3 | 0 | 291 | LOD3 | 0 |
| 211 | LOD2 | 0 | 251 | LOD3 | 0 | 292 | LOD3 | 0 |
| 212 | LOD2 | 0 | 252 | LOD3 | 0 | 293 | LOD1 | 1 |
| 213 | LOD2 | 0 | 253 | LOD3 | 0 | 294 | LOD2 | 0 |
| 214 | LOD2 | 0 | 254 | LOD1 | 0 | 295 | LOD2 | 0 |
| 215 | LOD2 | 0 | 255 | LOD0 | 1 | 296 | LOD3 | 0 |
| 216 | LOD1 | 0 | 256 | LOD2 | 0 | 297 | LOD3 | 0 |
| 217 | LOD1 | 0 | 257 | LOD2 | 0 | 298 | LOD2 | 0 |
| 219 | LOD2 | 1 | 259 | LOD3 | 1 | | | |
| 220 | LOD2 | 0 | 260 | LOD3 | 0 | | | |
| 221 | LOD2 | 0 | 261 | LOD3 | 0 | | | |
| 222 | LOD2 | 0 | 262 | LOD3 | 0 | | | |
| 223 | LOD2 | 0 | 263 | LOD3 | 0 | | | |
| 224 | LOD2 | 0 | 264 | LOD1 | 0 | | | |
| 225 | LOD2 | 0 | 265 | LOD1 | 0 | | | |
| 226 | LOD0 | 1 | 266 | LOD2 | 0 | | | |
| 227 | LOD1 | 0 | 267 | LOD2 | 0 | | | |
| 229 | LOD2 | 1 | 270 | LOD3 | 0 | | | |
| 230 | LOD2 | 0 | 271 | LOD3 | 0 | | | |
| 231 | LOD2 | 0 | 272 | LOD3 | 0 | | | |
| 232 | LOD1 | 0 | 273 | LOD3 | 0 | | | |
| 233 | LOD0 | 1 | 274 | LOD2 | 0 | | | |
| 234 | LOD0 | 1 | 275 | LOD2 | 0 | | | |
| 235 | LOD0 | 1 | 276 | LOD2 | 0 | | | |
| 236 | LOD0 | 1 | 277 | LOD2 | 0 | | | |
| 237 | LOD1 | 0 | 280 | LOD3 | 0 | | | |
| 239 | LOD3 | 0 | | | | | | |
| 240 | LOD2 | 0 | | | | | | |

FIG 2E 300
310
Creating a sparse texture translation map.
320
Performing a probe process utilizing the sparse texture translation map information to return a finest LOD that contains the texels for a texture lookup operation.
330
Performing the texture lookup operation utilizing the finest LOD.
FIG 3

400

---

410
Receiving texture coordinates.

420
Forming a footprint of a texture filter within the sparse texture translation map.

430
Performing a maximum operation on said finest LOD numbers within the footprint of the texture filter.

710
Dividing a texture into a large number of identically sized tiles in a first memory space.

720
Mapping a subset of the tiles to a second memory space.

730
Determining a minimum LOD clamp.

740
Performing a texture lookup utilizing said minimum LOD clamp.

1410
Determining a paging update is desired for texture operations

1420
Performing a user mode driver (UMD) process wherein the user mode driver process includes forwarding information associated with a page update 1430
Performing a kernel mode driver (KMD) process wherein the kernel mode update process directs page table update operations in accordance with the information forwarded by the user mode driver (UMD) process

1510
Determining a paging update is desired for texture operations

1520
Performing a user mode driver (UMD) process wherein the user mode driver process puts a software command or method into a push buffer

1530
Performing a kernel mode driver (KMD) process wherein the kernel mode update process the KMD process directs page table update operations in accordance with the information forwarded by the (UMD) process

1610
Determining a paging update is desired for texture operations

1620
Performing a user mode driver (UMD) process wherein the user mode driver process inserts or changes allocation references in UMD command buffers

1630
Performing a kernel mode driver (KMD) process wherein the kernel mode update process includes page update operations in response to the allocation reference changes in block 1620

1710
Determining a paging update is desired for texture operations

1720
Performing a user mode driver (UMD) process wherein the user mode driver process includes forwarding page table update commands in its own command buffers

1730
Performing a kernel mode driver (KMD) process wherein the kernel mode update process performs a kernel mode driver page table update process

1805
Creating a dedicated sparse texture TLB

1810
Determining a paging update is desired for texture operations

1820
Performing a user mode driver (UMD) process that controls the dedicated sparse texture TLB

1830
Performing a kernel mode driver (KMD) process that controls the primary TLB

FIG 18

SPARSE TEXTURE SYSTEMS AND METHODS

FIELD OF THE INVENTION

The present invention relates to the field of graphics processing.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities often involve the dissemination of information through the presentation of various graphics images on a display.

The operations performed by graphics pipeline stages associated with rendering an image can be very complex and as demands for ever better and faster graphics rendering grow the amount of processing operations and information involved typically increase. For example, the size of textures (e.g., 1 million by 1 million texels and larger) utilized by applications have grown significantly and often are much larger than practical capacities of system memories resulting in only a small portion of possible texture information being resident in memory. In addition, even if enough memory is provided, loading or swapping the large amounts of texture information into memory usually takes significant amounts of time slowing down the texture operations. Significant interference with the timing of the texture operations can result in diminished presentation performance and user experience.

SUMMARY

Systems and methods for texture processing are presented. In one embodiment a texture method includes creating a sparse texture residency translation map; performing a probe process utilizing the sparse texture residency translation map information to return a finest LOD that contains the texels for a texture lookup operation; and performing the texture lookup operation utilizing the finest LOD. In one exemplary implementation, the finest LOD is utilized as a minimum LOD clamp during the texture lookup operation. A finest LOD number indicates a minimum resident LOD and a sparse texture residency translation map includes one finest LOD number per tile of a sparse texture. The sparse texture residency translation map can indicate a minimum resident LOD.

In one embodiment, the probe process comprises: receiving texture coordinates; forming a footprint of a texture filter within the sparse texture residency translation map; and performing a maximum operation on the finest LOD numbers within the footprint of the texture filter. The probe process can track tiles that would have been used if the minimum LOD clamp is not utilized. For example, the probe process tracks the tiles utilizing a usage feedback map that includes one bit per tile, wherein the bit indicates whether the tile would have been touched by the texture lookup. The sparse texture residency translation map can be utilized to translate a desired LOD into a minimum resident LOD. The sparse texture residency translation map can correspond to a MIP-mapped texture. The probe process determines the maximum of the minimum resident LODs. The maximum of the minimum resident LODs can be utilized as the minimum clamp for the texture lookup operation.

In one embodiment a texture unit includes: an instruction input component for receiving texture instructions and texture coordinates; a level of detail component for determining a level of detail for performing the instructions at the texture coordinates, wherein the level of detail component weighs residency of texture information in determining the level of detail; a texture determination component for calculating an address of a texture corresponding to the level of detail determined by the level of detail component and fetching the texture; and a texture filter component for filtering the texture and forwarding a result. In one exemplary implementation, the level of detail component determines a clamp for the level of detail. The level of detail component can utilize a finest LOD as a minimum LOD clamp on the level of detail and a sparse texture residency translation map. For example, the level of detail component can utilize a sparse texture residency translation map to indicate a minimum resident LOD. A finest LOD number can indicate the minimum resident LOD and a sparse texture residency translation map includes one finest LOD number per tile of a sparse texture. The texture unit can include a non-resident requested tiles tracking component for tracking tiles that are requested but non-resident. The texture filter component can include a maximum filter component for performing maximum with accumulate operations.

In one embodiment a texture unit includes: a level of detail component for determining a level of detail for performing texture instructions; a texture determination component for calculating an address of a texture corresponding to the level of detail determined by the level of detail component and fetching the texture; a non-resident requested tiles tracking component for tracking tiles that are requested but non-resident; and a texture filter component for filtering the texture and forwarding a result. In one exemplary implementation, the non-resident requested tiles tracking component includes a cache. The cache can be included in a read modify write path associated with the texture unit. The non-resident requested tiles tracking component can include an OR component for performing an atomic OR operation for coalescing cached values from multiple texture pipe components. The atomic OR can be performed when evicting textel information out of memory. The non-resident requested tiles tracking component can track tiles that would have been used if a minimum LOD clamp is not utilized. The non-resident requested tiles tracking component can track the tiles utilizing a usage feedback map that includes one bit per tile, wherein the bit indicates whether the tile would have been touched by a texture lookup if a LOD clamp is not utilized in the level of detail component. In one embodiment, the non-resident requested tiles tracking component utilizes a usage feedback map.

In one embodiment a graphics processing system includes: a shader component for performing shading operations; and a texture unit for performing sparse texture operations utilizing a sparse texture residency translation map. The texture unit determines a clamp on a level of detail based upon the sparse texture residency translation map. In one exemplary implementation, the texture unit can perform a texture lookup in the sparse texture residency translation map and can utilize a usage feedback map.

DESCRIPTION OF THE DRAWINGS

The accompanying drawings, which are incorporated in and form a part of this specification, are included for exemplary illustration of the principles of the present and invention and not intended to limit the present invention to the particular implementations illustrated therein. The drawings are not to scale unless otherwise specifically indicated.

FIG. 2E is an exemplary table format of sparse texture residency translation map information in accordance with one embodiment of the present invention.

FIG. 3 is a flow chart of an exemplary sparse texture method in accordance with one embodiment of the present invention.

FIG. 4 is a block diagram of probe process in accordance with one embodiment of the present invention.

FIG. 7 is a block diagram of exemplary texture method in accordance with one embodiment of the present invention.

FIG. 14 is a flow chart of a texture mapping update method in accordance with one embodiment of the present invention.

FIG. 15 is a flow chart of a texture mapping update method in accordance with one embodiment of the present invention.

FIG. 16 is a flow chart of exemplary texture mapping update method in accordance with one embodiments of the present invention.

FIG. 17 is a flow chart of exemplary texture mapping update method in accordance with one embodiments of the present invention.

FIG. 18 is a flow chart of exemplary texture mapping update method in accordance with one embodiments of the present invention.

DETAILED DESCRIPTION

Figure 1:
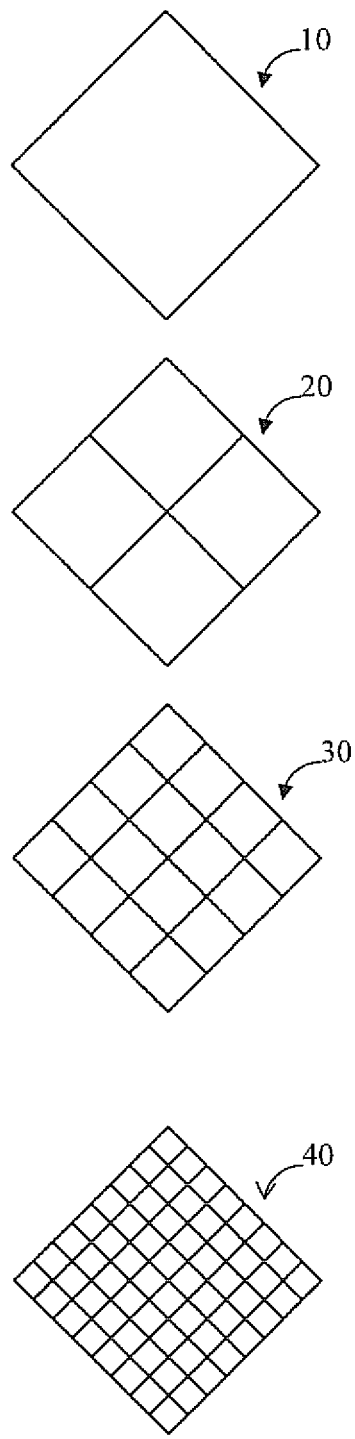
FIG. 1 is a block diagram of an exemplary representation of different levels of detail (LOD) in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods facilitate efficient and effective texture graphics processing. In one embodiment, the present system and methods utilize sparse texture support to allow an application to manage very large textures with relatively small or sparse texture working sets. In one exemplary implementation, a sparse texture is divided into a large number of identically sized tiles, and although referred to as a sparse texture the sparse texture can still be a relatively large texture (e.g., 256K by 256K texels, 128K by 128 K texels, etc.). The entire size of the sparse texture can occupy a correspondingly large range of virtual memory, but actual data only sparsely populates the range of physical memory. In one embodiment, this is done by mapping only a sparse subset of the tiles within the overall texture to actual physical memory. A hardware texture unit can address the texture via virtual addresses, but therefore, runs the risk of supplying an address for which there is no corresponding physical memory (in prior art systems, this would cause a page fault).

To facilitate minimization of page faults associated with a texture lookup, in one embodiment, a shader or texture program can first perform a lookup into a sparse texture residency translation map, and return the finest LOD that contains the texels needed for the texture lookup. The returned finest LOD is then used as a minimum LOD clamp in the subsequent texture lookup. The tiles that would have been used if the minimum LOD clamp was not applied can also be tracked. As an alternative to addressing of the sparse texture via virtual memory page tables, a separate sparse-to-physical address translation table can be used.

In one embodiment, a PROBE instruction is utilized to direct operations associated with the sparse texture residency translation map look up and tracking operations. The PROBE instruction can perform a texture-like lookup into a sparse texture residency translation map. The sparse texture residency translation map includes one finest level of detail (FinestLOD) number per tile in the entire sparse texture, where the FinestLod number indicates the finest LOD that is resident in physical memory. The PROBE instruction can retrieve texture coordinates, form a footprint of the texture filter within the sparse texture residency translation map (e.g., that may touch multiple tiles, etc.), and perform a maximum operation on the FinestLod numbers within the footprint of the texture filter, thereby determining the finest LOD that is resident for needed texels in the texture lookup. The PROBE instruction can track the tiles that would have been used if the minimum LOD clamp was not applied. This is done by maintaining a Usage Feedback Map in memory that includes one bit per tile, the one bit indicating whether the tile would have been touched by texture lookups.

In one embodiment, the PROBE instruction is essentially a texture lookup into the sparse texture residency translation map, which is mip-mapped, like a texture. In one exemplary implementation a lookup into a sparse texture can take two lookups: one for the PROBE instruction, and one for the TEX instruction. In one exemplary implementation, the TEX instruction can be modified to return a "Not Resident Flag" to the shader program. The instruction sequence is replaced with the three-instruction sequence: (1) perform a TEX instruction that returns a TRUE Not Resident Flag if any needed tiles are not resident; (2) if Not Resident is TRUE, do a PROBE instruction; and (3) retry the TEX instruction using the result of the PROBE as an LOD clamp. In one exemplary implementation of the three-instruction approach, only the first TEX is performed most of the time (since the application program typically tries to keep all needed texture tiles resident), and only rarely is the retry performed. In one embodiment, a LOD is passed from the PROBE instruction to TEXT through a register.

In one embodiment, a tiles needed (TilesNeeded) surface is read by the application program, which decides which tiles can be added or removed from being resident. The tiles needed operations can be performed at a variety of times (e.g., at the end of the frame, a time the application designates, etc.). Alternatively, a determination (e.g., by a compute program) is made as to which tiles can be added or removed from being resident. In one embodiment, tiles that need to change residency can be detected by performing an XOR between the Usage Feedback Map and a one-bit current residency map. In one embodiment, an application can facilitate residency updates including for making resident information that is needed and not resident and evicting tiles that are resident and not needed. A compute shader can determine which tiles to make resident and which tiles to evict.

In one embodiment, each texture level of detail (LOD) is split or segmented into a set of tiles. Multiple finer or lower LOD tiles can correspond to or "fit in" one tile from a higher or coarser LOD. Several finer lower LOD tiles can correspond to the same texture coordinate space (e.g., s,t coordinate space, etc.) as one coarser higher LOD tile. FIG. 1 is a block diagram of an exemplary representation of different levels of detail (LOD) in accordance with one embodiment of the present invention. In LOD 40 there are 64 tiles and in LOD 30 there are 16 tiles. In LOD 20 there are 4 tiles and in LOD 10 there is one tile. In one exemplary implementation, an application manages the residency of the tiles in memory.

Figure 2A:
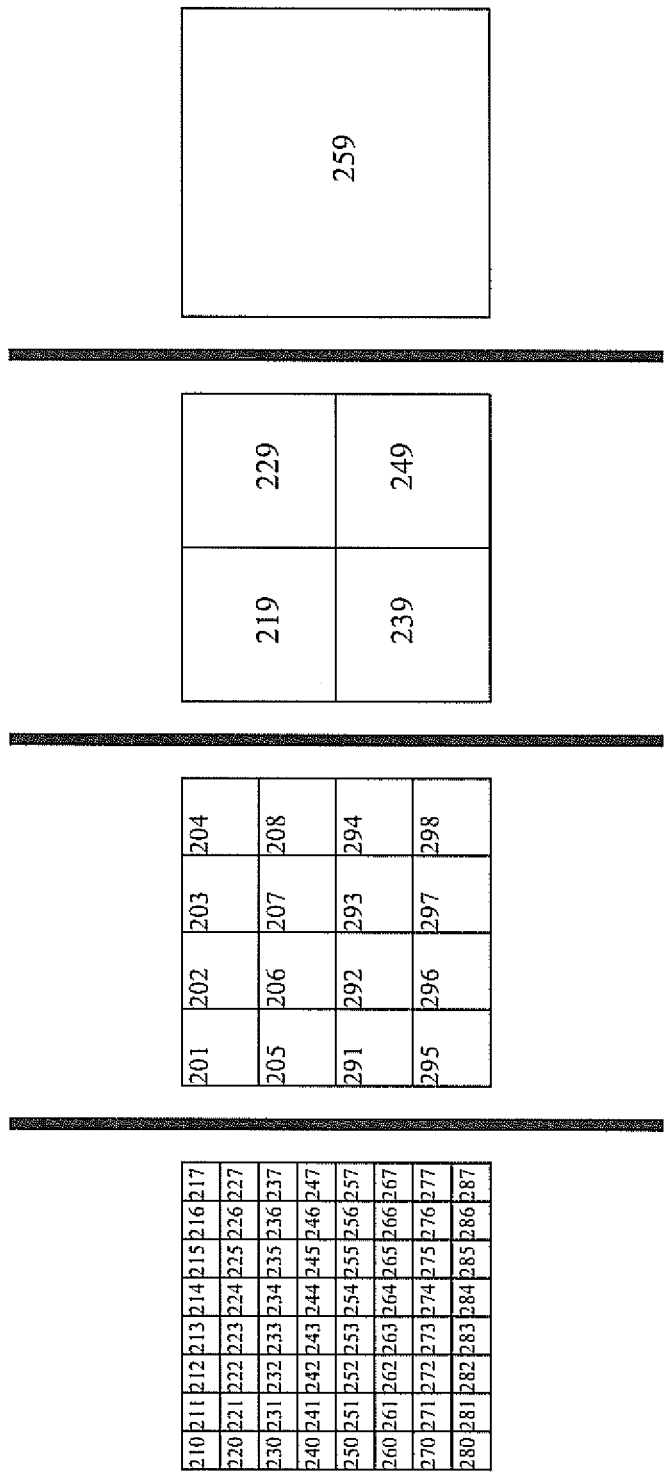
FIG. 2A is a block diagram of another exemplary representation of tiles in different LODs in compliance with a sparseness residency rule in accordance with one embodiment of the present invention.

FIG. 2A is a block diagram of another exemplary representation of tiles in different LODs in compliance with a sparseness residency rule in accordance with one embodiment of the present invention. For example, tiles 210-217, 220-227, 330-237, 240-247, 250-257, 260-267, 270-277 and 280-287 correspond to LOD 0. Tiles 201-208 and 291-298 correspond to LOD 1. Tiles 219, 229, 239 and 249 correspond to LOD 2 and tile 259 corresponds to LOD 3. A subset of tiles from a lower LOD also correspond to an overlapping s and t space tile in a higher LOD. For example, tiles 210, 211, 220, 221 correspond to tile 201; tiles 212, 213, 222, and 223 correspond to tile 202; and tiles 274, 275, 284 and 285 correspond to tile 297. Tiles 201, 202, 205 and 206 correspond to tile 219; and tiles 293, 294, 297 and 298 correspond to tile 249. Tiles 219, 229, 239 and 249 correspond to tile 259.

Figure 2B:
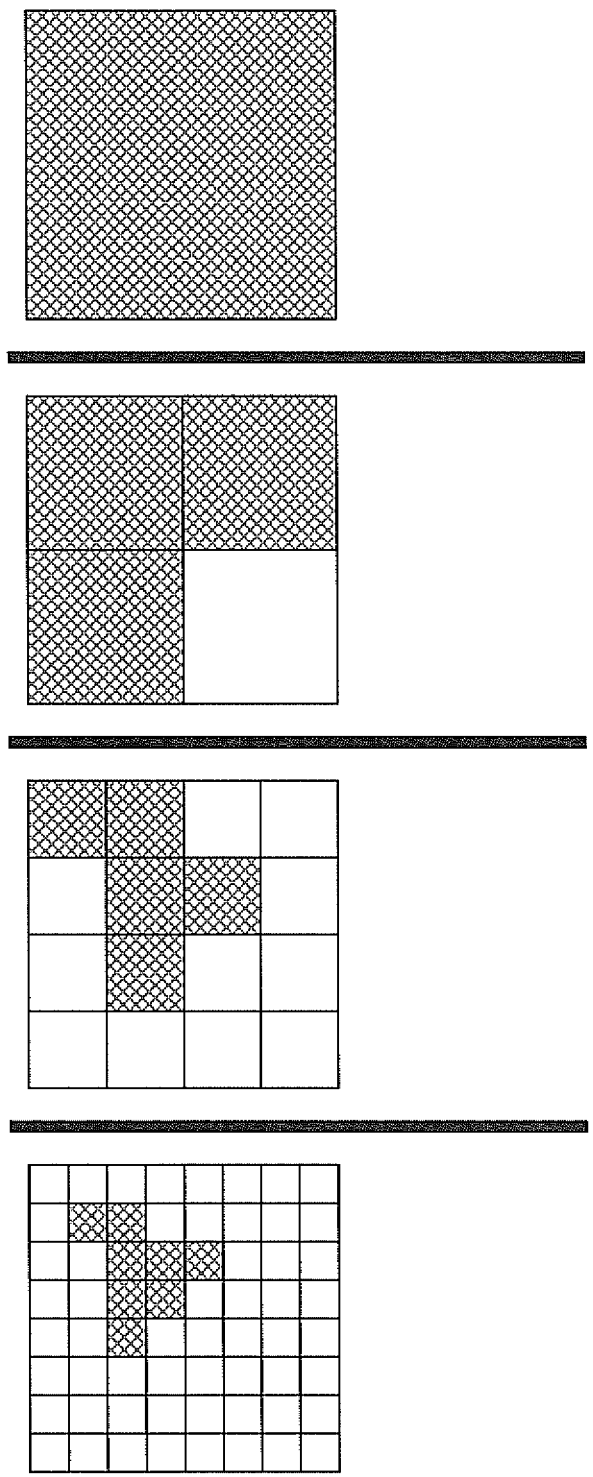
FIG. 2B is a block diagram of another exemplary representation of tiles in different LODs in compliance with a sparseness residency rule in accordance with one embodiment of the present invention.

In one embodiment, a texture mapping scheme conforms to a variety of sparseness rules that define relationships of tiles at different levels of detail with respect to memory residency. For example, if a tile is resident in a finer LOD then a corresponding tile in coarser LODs are also resident. FIG. 2B is a block diagram of another exemplary representation of tiles in different LODs in compliance with a sparseness residency rule in accordance with one embodiment of the present invention. For example, the tiles 233, 234, 235, 236, 244, 245, 226 and 255 designated by the cross hatched areas in LOD 0 are resident in memory. Give the rule that if a tile is resident in a finer LOD then a corresponding tile in coarser LODs are also resident. Thus, tile 204 is also resident because it is a higher or coarser level LOD tile corresponding to tile 226; tile 206 is resident because it is a higher level LOD tile corresponding to tile 233; tile 207 is resident because it is a higher level LOD tile corresponding to tiles 234, 235, 244 and 245. Tile 219 is resident because it is a higher level LOD tile corresponding to tile 206, tile 229 is resident because it is a higher level LOD tile corresponding to tiles 204, 207 and 208, and tile 249 is resident because it is a higher level LOD tile corresponding to tile 293. Tile 259 is resident because it is a higher level LOD tile corresponding to tiles 219, 229 and 249.

Figure 2C:
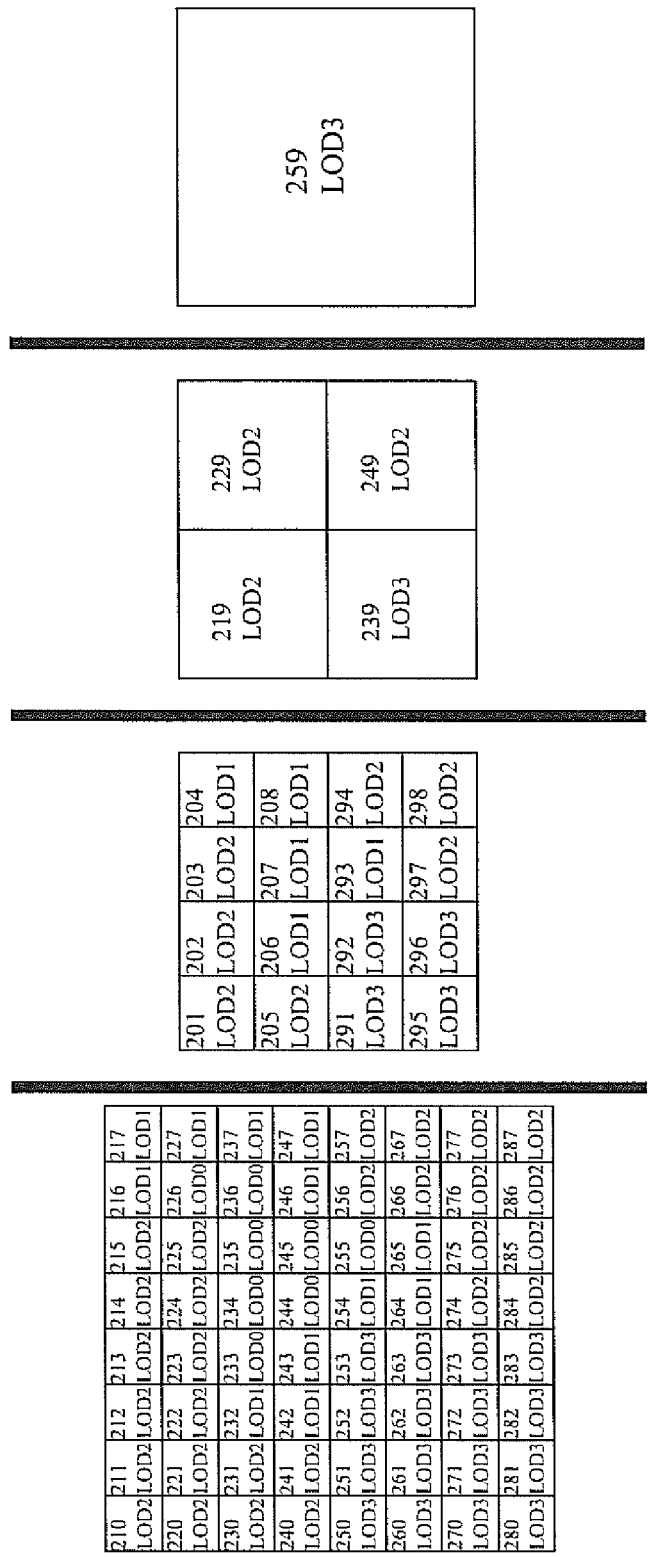
FIG. 2C is a block diagram representation of a sparse texture residency translation map in accordance with one embodiment of the present invention.

FIG. 2C is a block diagram representation of a sparse texture residency translation map in accordance with one embodiment of the present invention. The sparse texture residency translation map indicates the finest LOD resident in memory that corresponds to a texel. For example, texel 210 indicates texture data for LOD 2 is resident in memory, texel 272 corresponds to LOD 3 texture information resident in memory, texel 234 corresponds to LOD 0 texture information resident in memory, and texel 247 corresponds to LOD 31 texture information resident in memory. Correspondingly, texel 201 corresponds to LOD 2 texture information resident in memory, texel 296 corresponds to LOD 3 texture information resident in memory, texel 207 corresponds to LOD 1 texture information resident in memory, and texel 208 corresponds to LOD 1 texture information resident in memory. Texels 219, 229 and 249 corresponds to LOD 2 texture information resident in memory and texel 259 corresponds to LOD 3 resident in memory. In one embodiment, the each texel can represent a tile of the original texture. In one exemplary implementation the sparse texture residency translation map is similar to a MIP-mapped texture. For example, each "texel" can be an multi-bit MIP-mapped finest LOD residency indicator for a tile. A sparse texture residency translation map can be utilized to "translate" a desired LOD into a minimum resident LOD.

Figure 2D:
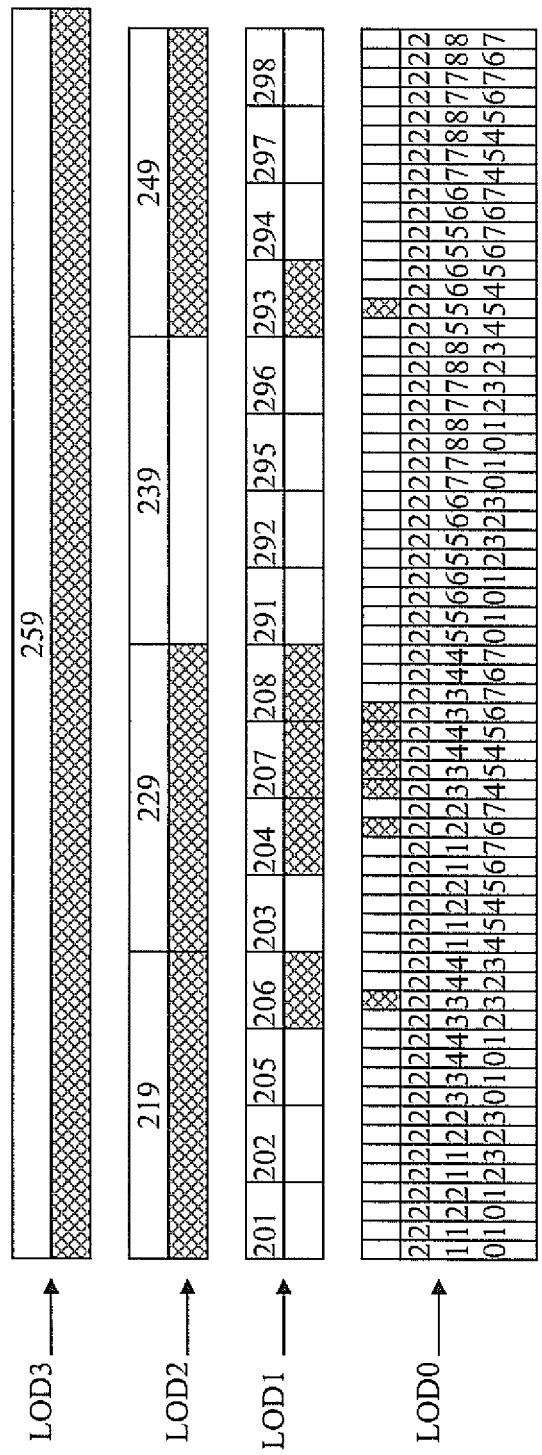
FIG. 2D is a block diagram of a MIP hierarchical representation of a sparse texture residency translation map in accordance with one embodiment of the present invention.

It is appreciated a sparse texture residency translation map can have a variety of configurations. FIG. 2D is a block diagram of a MIP hieracical representation of a sparse texture residency translation map in accordance with one embodiment of the present invention. Again, tiles 210-217, 220-227, 330-237, 240-247, 250-257, 260-267, 270-277 and 280-287 correspond to LOD 0. Tiles 201-208 and 291-298 correspond to LOD 1. Tiles 219, 229, 239 and 249 correspond to LOD 2 and tile 259 corresponds to LOD 3. A subset of tiles from a lower LOD also correspond to an overlapping s and t space tile in a higher LOD. For example, tiles 210, 211, 220, 221 correspond to tile 201; tiles 212, 213, 222, and 223 correspond to tile 202; and tiles 274, 275, 284 and 285 correspond to tile 297. Tiles 201, 202, 205 and 206 correspond to tile 219; and tiles 293, 294, 297 and 298 correspond to tile 249. Tiles 219, 229, 239 and 249 correspond to tile 259. Tiles 233, 234, 235, 236, 244, 245, 226 and 255 designated by the cross hatched areas in LOD 0 are resident in memory. Again, tile 204 is also resident because it is a higher level LOD tile corresponding to tile 226; tile 206 is resident because it is a higher level LOD tile corresponding to tile 233; tile 207 is resident because it is a higher level LOD tile corresponding to tiles 234, 235, 244 and 245. Tile 219 is resident because it is a higher level LOD tile corresponding to tile 206, tile 229 is resident because it is a higher level LOD tile corresponding to tiles 204, 207 and 208, and tile 249 is resident because it is a higher level LOD tile corresponding to tile 293. Tile 259 is resident because it is a higher level LOD tile corresponding to tiles 219, 229 and 249.

It is appreciated sparse texture residency translation map information can be tracked or represented in a variety of data structures. It is also possible for the sparse texture residency translation map information to be included in a table format. FIG. 2E is an exemplary table format of sparse texture residency translation map information in accordance with one embodiment of the present invention. Again it is appreciated, each texel can represent a tile of the original texture.

FIG. 3 is a flow chart of exemplary sparse texture method 300 in accordance with one embodiment of the present invention. In one embodiment, borders work properly an do not need LOD-generating pre-pass. In one exemplary implementation, higher order filters (e.g. trilinear, aniso, etc.) work without extra work. Various texture formats can also be mixed. Tiles can be either constant texel size or tiles can be constant size in memory footprint. There can be constant texel size regardless of format or the same number of bytes regardless of format.

In block 310, a sparse texture residency translation map is created. In one embodiment, the sparse texture residency translation map indicates a minimum resident LOD. In one exemplary implementation, the sparse texture residency translation map corresponds to a MIP-mapped texture.

In block 320, a probe process utilizing the sparse texture residency translation map information is performed. In one embodiment, the probe process returns a finest LOD that contains the texels for a texture lookup operation. In one exemplary implementation, the finest LOD number indicates a minimum resident LOD and a sparse texture residency translation map includes one finest LOD number per tile of a sparse texture. In one embodiment, the sparse texture residency translation map is utilized to translate a desired LOD into a minimum resident LOD.

In block 330, the texture lookup operation is performed utilizing the finest LOD. In one embodiment, the finest LOD is utilized as a minimum LOD clamp during the texture lookup operation. For example, the maximum of the minimum resident LODs can be utilized as the minimum clamp for the texture lookup operation.

It is appreciated that a probe process can include a variety of operations. In one embodiment, a probe process determines the maximum of the minimum resident LODs. FIG. 4 is a block diagram of probe process 400 in accordance with one embodiment of the present invention. In one embodiment, a probe process includes MIP computation per quad and not per pixel.

In block 410, texture coordinates are received. In one embodiment, s and t coordinates are received.

In block 420, a footprint of a texture filter is formed within the sparse texture residency translation map.

In block 430, a maximum operation on the finest LOD numbers within the footprint of the texture filter is performed.

A probe process can also include a residency feedback process. In one embodiment the probe process tracks tiles that would have been used if the minimum LOD clamp is not utilized. In one exemplary implementation, the probe process tracks the tiles utilizing a usage feedback map that includes one bit per tile, wherein the bit indicates whether the tile would have been touched by the texture lookup. In one embodiment, an atomic OR operation to memory is performed for each PROBE instruction. A write back cache can be maintained and when data is flushed from the write-back cache, an atomic OR operation is done resulting in a coalesce operation. In yet another embodiment, bits in the Usage Feedback Map are set.

Figure 5:
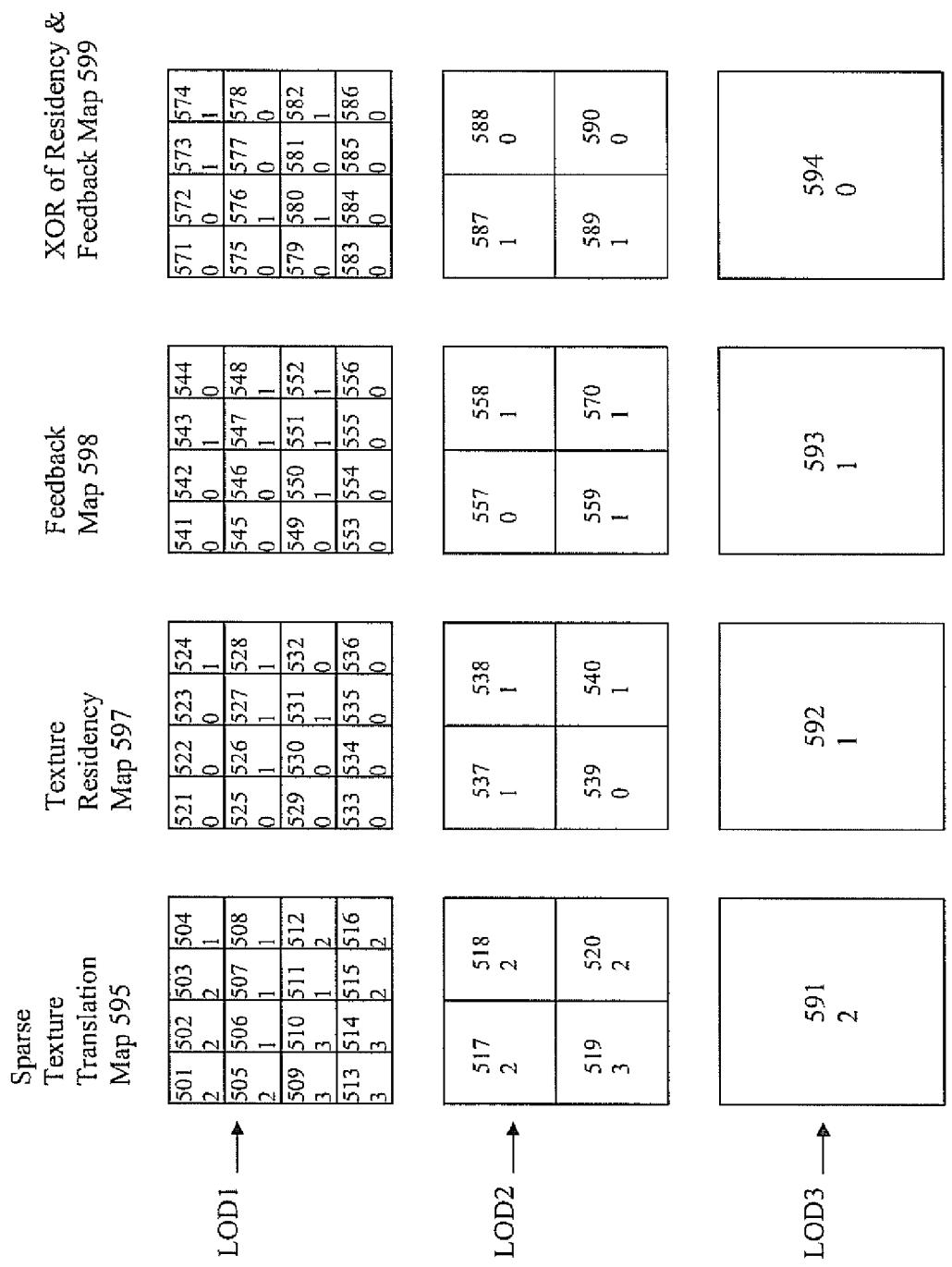
FIG. 5 is a block diagram of exemplary feedback features in accordance with one embodiment.

FIG. 5 is a block diagram of exemplary feedback architecture 500 in accordance with one embodiment. Feedback architecture 500 includes sparse texture residency translation map 595, one bit MIP-mapped residency map 597, usage feedback map 598 and XOR of residency and feedback map 599. Sparse texture residency translation map 595 includes LOD1 map tiles 501 through 516, LOD2 tiles 517 through 520 and LOD tile 591. One bit MIP-mapped residency map 597 includes LOD1 map tiles 521 though 536, LOD2 tiles 537 through 540 and LOD3 tiles 592. Feedback map 598 includes LOD1 map tiles 541 through 556, LOD2 tiles 557 through 570 and LOD tile 593. XOR of residency and feedback map 599 includes LOD1 tiles 571 through 586, LOD2 tiles 587 through 590 and LOD3 tile 594. In one embodiment, sparse texture residency translation map 510 can be an eight-bit MIP mapped residency map, usage feedback map 598 can be a one-bit MIP-mapped feedback map. Sparse texture residency translation map 510 and one bit MIP mapped residency translation map 520 can convey information similar to sparse texture residency translation map and residency translation map shown in FIGS. 2C and 2B. Usage feedback map 530 includes a map indicating whether a tile would have been touched by the texture lookup. XOR of residency and usage feedback map 540 includes results of an XOR of the residency and the feedback map. The information from sparse texture residency translation map 595 can be input to a hardware so a TEX unit can determine residency. The information in one bit MIP-mapped residency map 597 can be derived from the sparse texture residency translation map 595 or can be maintained separately. The usage feedback map 598 can be governed by hardware and fed back to an application. The XOR of residency and feedback map 599 can be generated by an application (e.g., using a compute shader).

Figure 6:
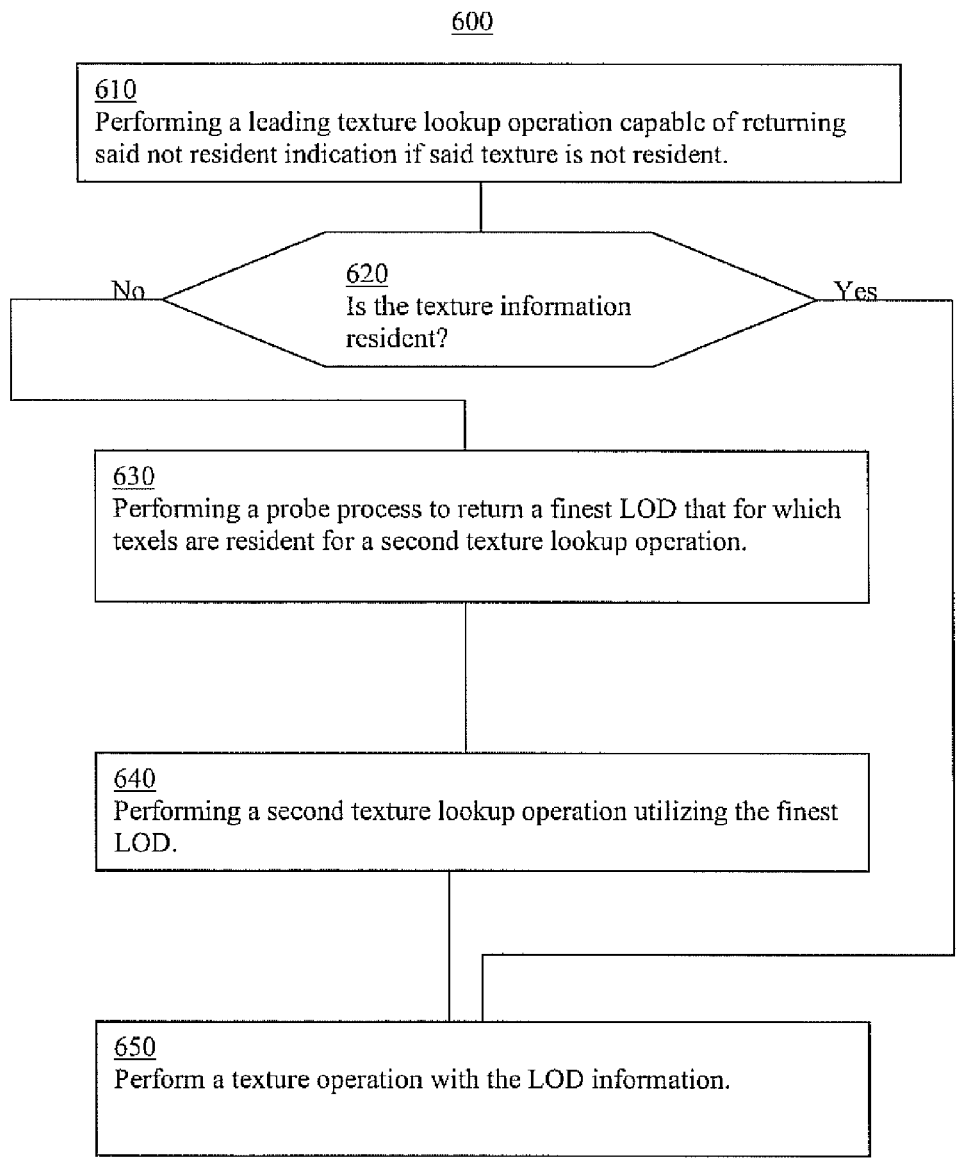
FIG. 6 is a flow chart of texture method in accordance with one embodiment of the present invention.

FIG. 6 is a flow chart of texture method 600 in accordance with one embodiment of the present invention. It is appreciated that embodiments of the present invention can be configured in a variety of implementations. In one embodiment, a regular tex process can be performed prior to a probe operation and if the tex process returns a non-resident indication for the desired texel then a probe process can be performed.

In block 610, a leading texture lookup operation is performed. In one embodiment, the leading texture lookup operation is capable of returning a not resident indication if the texture is not resident. In one exemplary implementation, the not resident indication is a flag.

In block 620, a determination is made if a not resident indication is returned. If the not resident indication is not returned (e.g., the information is resident) the process proceeds to block 650. If the not resident indication is returned the process proceeds to block 620.

In block 630 a probe process is performed if a not resident indication is true. In one embodiment, the probe process returns a finest LOD that contains the texels for a second texture lookup operation.

In block 640, a following second texture lookup operation is performed utilizing the finest LOD as a minimum LOD clamp. In one embodiment, a mapping to a memory space is utilized in determining a minimum LOD clamp.

It is appreciated that results of a probe process can be utilized for multiple texture lookup operations.

FIG. 7 is a block diagram of exemplary texture method 700 in accordance with one embodiment of the present invention. In one embodiment, mapping in the texture method utilizes system virtual memory to physical memory paging resources.

In block 710, a texture is divided into a large number of identically sized tiles in a first memory space. In one embodiment, the first memory space is a virtual memory space.

In block 720, a subset of the tiles are mapped to a second memory space. In one embodiment, the second memory space is a physical memory space. In one exemplary implementation, the subset is a sparse subset of tiles within the texture. The mapping can utilize a dedicated virtual to physical address translation table.

In block 730, a minimum LOD clamp is determined. In one embodiment, a sparse texture residency translation map is utilized to determine a minimum LOD clamp.

In block 740, a texture lookup is performed utilizing the minimum LOD clamp. In one embodiment, the minimum LOD clamp is the finest LOD that contains texels needed for the texture lookup.

Figure 8:
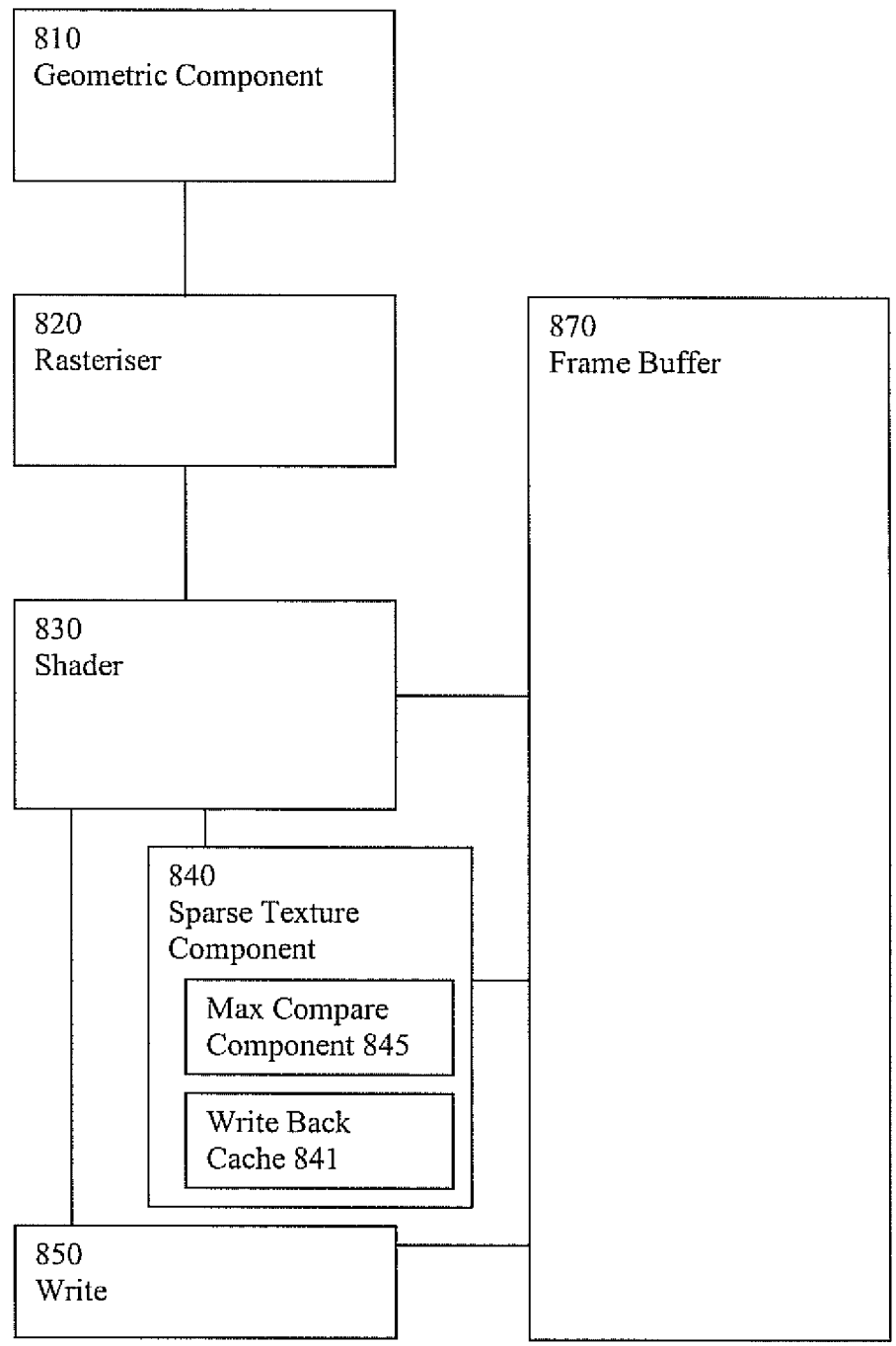
FIG. 8 is a block diagram of a graphics pipeline in accordance with one embodiment of the present invention.

FIG. 8 is a block diagram of a graphics pipeline 800 in accordance with one embodiment of the present invention. In one embodiment a graphics pipeline 800 is included in a graphics system. Graphics pipeline 800 includes geometric setup component 810, rasterizer component 820, shader 830, sparse texture component 840, write component 850 and frame buffer 870. Geometric setup component 810 is communicatively coupled to rasterizer component 820 which is communicatively coupled to shader 810. Shader 810 is communicatively coupled to sparse texture component 840 and write component 850 which are communicatively coupled to frame buffer 870. The components of graphics pipeline 800 cooperatively operate to process graphics information. It is appreciated that graphics pipelines can have a variety of configurations. For example there can be multiple shaders, vertex shaders can be included in the geometric setup component, etc. In one exemplary implementation, any shader in the pipeline can use sparse textures.

Geometric setup component 810 receives vertex data, determines vertices information, and forwards the information to raster component 820. Geometric setup component 810 can perform geometrical transformation of coordinates, perform viewport transforms, perform clipping and prepare perspective correct parameters for use in raster component 820, including parameter coefficients. In one embodiment, the setup unit applies a user defined view transform to vertex information and determines screen space coordinates for each triangle. In one embodiment, geometric setup component 810 sets up barycentric coefficients for raster component 820.

Rasterizer component 820 determines which pixels correspond to a particular triangle and interpolates parameters (e.g., x, y and z coorindate values) from geometric setup component 810 associated with the triangle to provide a set of interpolated parameter variables and instruction pointers or sequence numbers associated with (e.g., describing) each pixel. For example, rasterizer component 820 can provide a "translation" or rasterization from a triangle view to a pixel view of an image. In one embodiment, rasterizer component 820 scans or iterates each pixel in an intersection of a triangle and a scissor rectangle. For example, rasterizer component 820 can process pixels of a given triangle and determine which processing operations are appropriate for pixel rendering (e.g., operations related to color, texture, depth and fog, etc.).

Shader component 830 performs shading operations. In one embodiment shader component 830 requests texture input from sparse texture component 840. Shader component 830 forwards texel coordinates to sparse texture component 840 and applies returned textures to an image.

Sparse texture component 840 performs texture operations utilizing sparse textures. In one embodiment, sparse texture component 840 performs operations utilizing a sparse texture residency translation map. In one embodiment, sparse texture component 840 determines a clamp on a level of detail based upon the sparse texture residency translation map information. The sparse texture component 840 can perform a texture lookup in the sparse texture residency translation map. The sparse texture component 840 can provide an indication of additional textures that are desired but not resident in memory. In one exemplary implementation the sparse texture component 840 utilizes a residency feedback map. In one embodiment, sparse texture component 840 includes a maximum compare component 845 for performing a maximum operation. In one exemplary implementation, maximum compare component 845 for performs a maximum operation on the FinestLod numbers within a footprint of the texture filter, thereby determining the finest LOD that is resident for needed texels in the texture lookup.

Sparse texture component 840 can also include an optional write back cache. In one embodiment, the optional write back cache can store a cache texture of one bit values that determine which tiles are wanted but not resident. The write back cache can be relatively small (e.g., 16-32 tiles per texture, etc.). In one embodiment, the texture unit utilizes the write-back cache to maintain a record of what tiles were touched. The optional write back cache can also perform atomic operations in the memory by repeatedly ORing in the bit. When data is flushed from the write-back cache, an OR operation is done, and a coalesce operation is done by making the OR "atomic". The optional write back cache can perform atomic operations in the memory by repeatedly ORing in the bit corresponding to each texel tile. Also, the write-back cache is flushed out to memory at the end of frame. In one exemplary implementation, the atomic OR helps minimize complications if other texture units have different cached values. The caching of the TilesNeeded data faciliates the tracking of touched tiles in a practical timing manner from a performance perspective.

Figure 9:
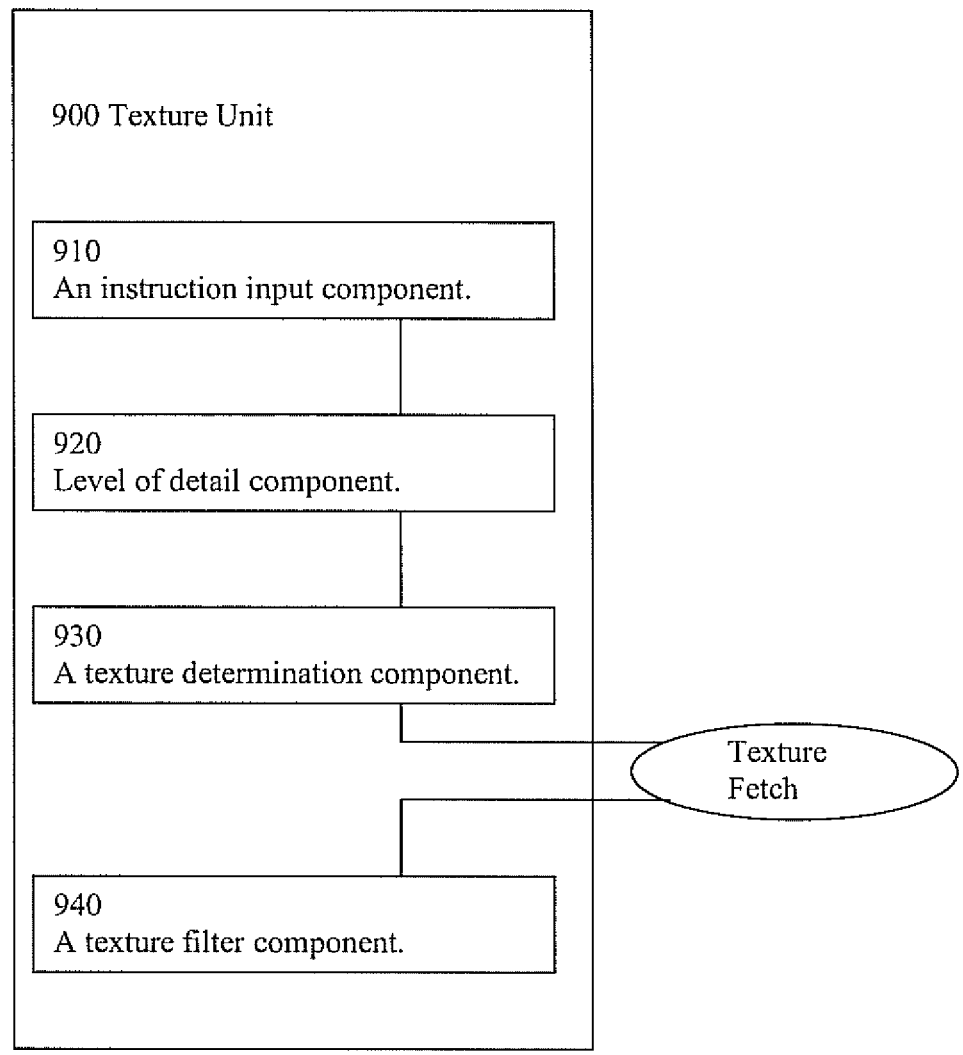
FIG. 9 is a block diagram of an exemplary texture unit configuration in accordance with one embodiment of the present invention.

FIG. 9 is a block diagram of an exemplary texture unit 900 in accordance with one embodiment of the present invention. Texture unit 900 includes instruction input component 910, level of detail component 920, texture determination component 930, and texture filter component 940. Instruction input component 910 receives texture instructions and texture coordinates. Level of detail (LOD) component 920 determines a level of detail for performing the instructions at the texture coordinates. In one embodiment, the level of detail component weighs residency of texture information in determining the level of detail. Texture determination component 930 calculates an address of a texture corresponding to the level of detail determined by the level of detail component and fetching the texture. Texture filter component 140 filters the texture and forwards a result. In one embodiment, the texture filter component includes a maximum filter component for performing maximum with accumulate operations.

It is appreciated the level of detail component can perform a variety of operations. In one embodiment, the level of detail component determines a clamp for the level of detail. In one exemplary implementation the level of detail component utilizes a finest LOD as a minimum LOD clamp on the level of detail. The level of detail component can utilize a sparse texture residency translation map. For example, the level of detail component utilizes a sparse texture residency translation map to indicate a minimum resident LOD. The finest LOD number can indicate the minimum resident LOD. A residency translation map can include one finest LOD number per tile of a sparse texture.

Figure 10:
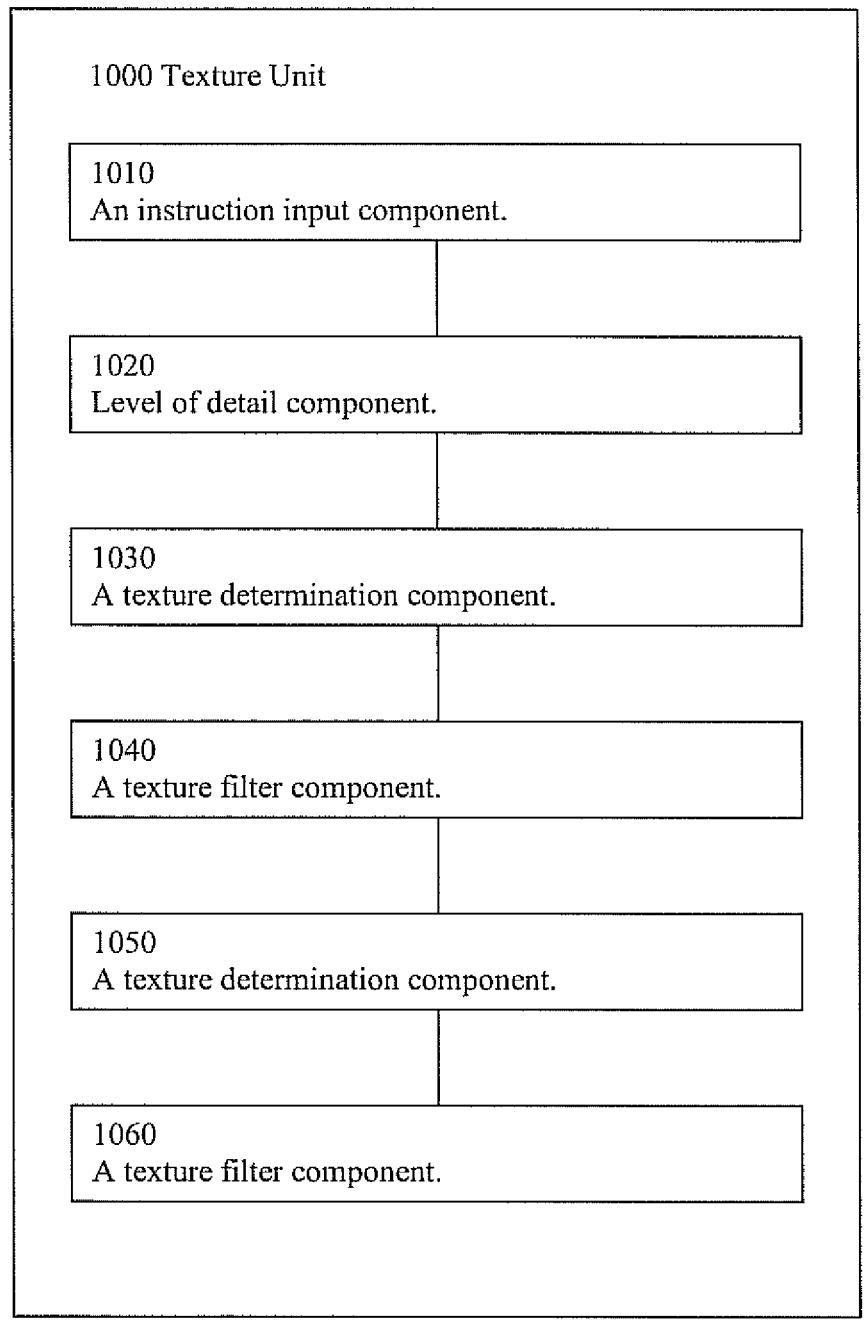
FIG. 10 is a block diagram of another exemplary texture unit configuration in accordance with one embodiment of the present invention.

FIG. 10 is a block diagram of exemplary texture unit 1000 in accordance with one embodiment of the present invention. Texture unit 1000 includes instruction input component 1010, level of detail component 1020, texture determination component 1030, and texture filter component 1040. Input component 1010, level of detail component 1020, texture determination component 1030, and texture filter component 1040 are similar to instruction input component 1010, level of detail component 1020, texture determination component 1030, and texture filter component 1040. Texture unit 1000 also includes non-resident requested tiles tracking component 1070 for tracking tiles that are requested but non-resident. In one embodiment, the non-resident requested tiles tracking component 1070 includes a cache. The cache can be included in a read modify write path associated with the texture unit. In one exemplary implementation the non-resident requested tiles tracking component 1070 includes an OR component for performing an atomic OR operation for coalescing cached values from multiple texture pipe components. The atomic OR can be performed when evicting textel information out of memory.

In one embodiment, the non-resident requested tiles tracking component 1070 tracks tiles that would have been used if a minimum LOD clamp is not utilized. In one exemplary implementation, the non-resident requested tiles tracking component 1070 tracks the tiles utilizing a usage feedback map that includes one bit per tile, wherein the bit indicates whether the tile would have been touched by a texture lookup if a LOD clamp is not utilized in the level of detail component. The non-resident requested tiles tracking component 1070 can also utilize a usage feedback map.

Figure 11:
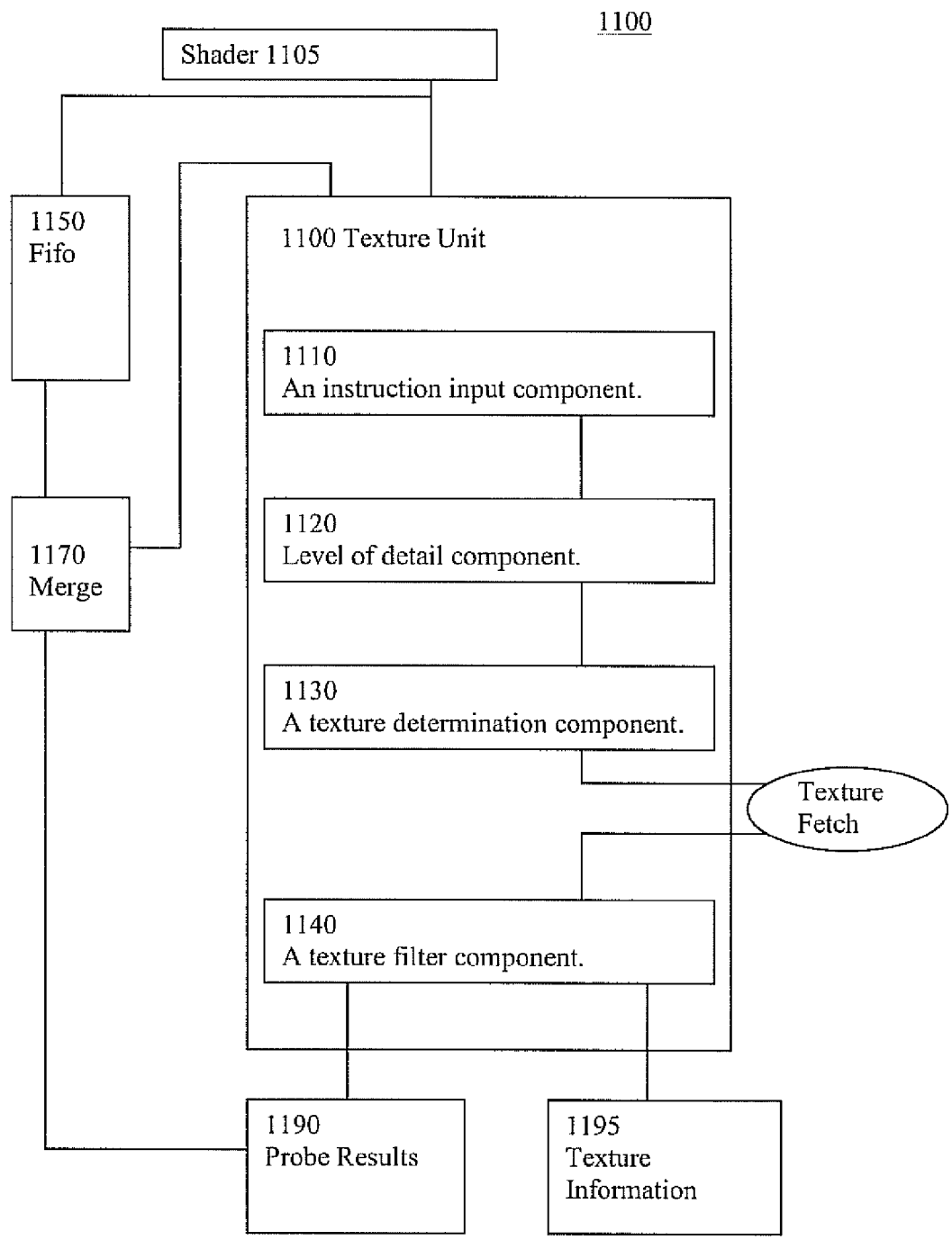
FIG. 11 is a block diagram of yet another exemplary texture unit configuration in accordance with one embodiment of the present invention

FIG. 11 is a block diagram of an exemplary texture unit 1100 in accordance with one embodiment of the present invention. Texture unit 1100 is similar to texture unit 900 except texture unit 1100 includes storage component 1150 and merge component 1170. In one embodiment, storage component 1150 is a FIFO. Information from shader component 1105 is fed into both instruction input component 1110 and storage component 1150. On a first pass in which the texture unit is utilized to perform a probe instruction, the information is fed down the pipeline and the results are output as probe results which are fed back to merge component 1170. Merge component 1170 determines the appropriate LOD between the probe results and the information from FIFO 1150. The appropriate LOD is fed back to instruction input component 1110 and texture information 1195 is fed to downstream components (not shown) of the graphics pipeline.

Figure 12:
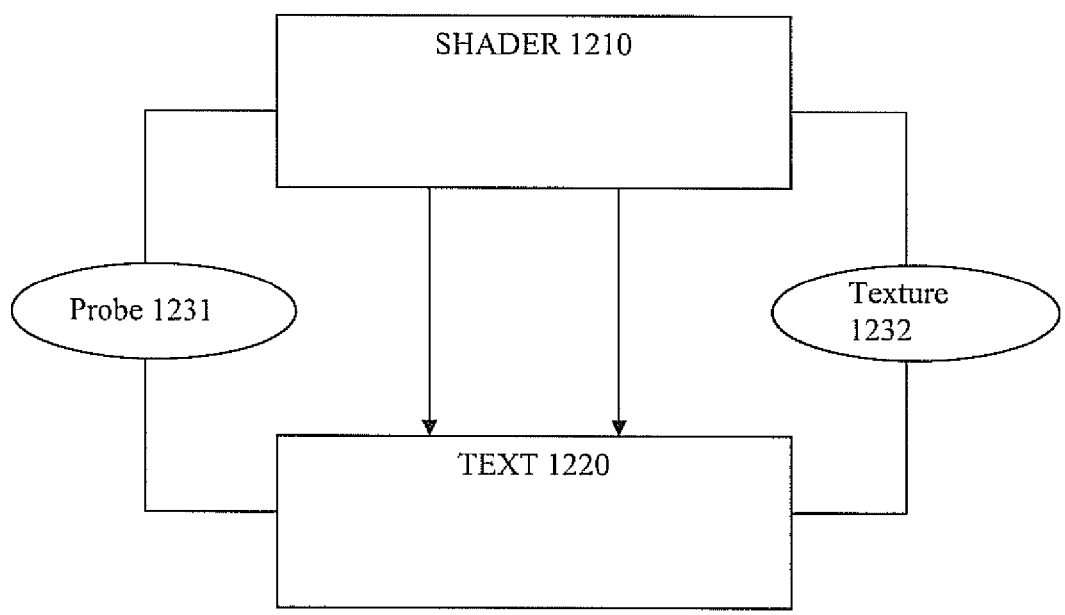
FIG. 12 is a block diagram of flow in a sparse texture pipeline in accordance with one embodiment of the present invention.

FIG. 12 is a block diagram of flow in a sparse texture pipeline 1201 in accordance with one embodiment of the present invention. In FIG. 12 shader 1210 sends a request for texture information from Tex 1220 which in turn sends a texture probe instruction to shader 1210. Shader 1210 returns the results of the texture probe instruction to tex 1220 which forwards texture information 1232 to shader 1210.

Figure 13:
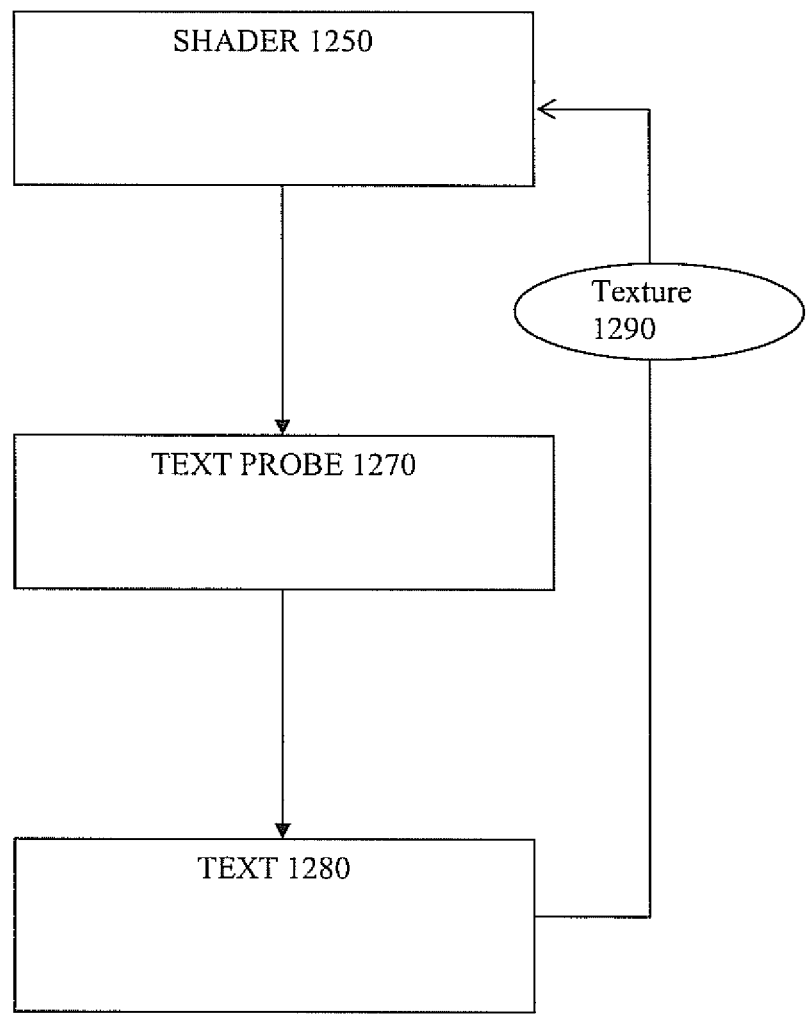
FIG. 13 is a block diagram of flow in another sparse texture pipeline in accordance with one embodiment of the present invention.

FIG. 13 is a block diagram of flow in a sparse texture pipeline 1202 in accordance with one embodiment of the present invention. In FIG. 13 shader 1250 sends a request for texture information to tex probe hardware 1270 which determines the appropriate LOD for the texture operations and forwards the appropriate LOD information with the request for texture information to classic texture hardware 1280 which returns the texture information to shader 1250.

In one embodiment, virtual memory and page tables are utilized in storing table information associated with sparse texture operations. In one exemplary implementation, an operating system running on a central processing unit (CPU) manages physical memory but the operating system does not have a sense of virtual memory for a graphics processing unit (GPU) which is performing the texture operations. The commands sent to the GPU refer to a virtual address of an object which does not change even though the physical memory can be moving around. Thus, changes in the GPU virtual memory and corresponding page tables rely upon OS initiated paging action.

In one embodiment, a user mode driver (UMD) associated with a GPU needs to provoke paging events, because it receives page-in and page-out requests from an application. But, that means the user mode driver needs to update the page tables in the GPU, which can only be done by the kernel mode driver (KMD) running on the CPU. Therefore, the UMD needs to call the KMD, but synchronized with data transfers to the GPU, which are done via a command buffer.

There are several approaches present methods can utilize to realize page table updates for the GPU. In a first approach, a hardware command embedded in the push buffer invokes a paging update interrupt. A second approach is to coerce a paging event. A third approach is to have a secondary TLB for texture to virtual address translation. A fourth approach utilizes page table update commands using the latest available mapping information. Exemplary embodiments of these approaches are set forth in the following description.

FIG. 14 is a flow chart of a texture mapping update method 1400 in accordance with one embodiment of the present invention. In one embodiment, texture mapping update method 1410 directs a page table update. In one exemplary implementation, the page table update is directed to making texture information resident in a system memory.

In block 1410, a determination is made that a paging update is desired for texture operations. In one embodiment, a residency feedback process indicates requested texture or tile information is not resident in memory.

In block 1420, a user mode driver (UMD) process is performed. In one embodiment, the UMD process includes forwarding information associated with a page update. In one exemplary implementation, the information includes a page table update trigger information. For example, the information can include an interrupt indication, locking information, information from a secondary TLB, buffer commands, etc.

In block 1430, a kernel mode driver (KMD) process is performed. In one embodiment, the KMD process directs page table update operations in accordance with the information forwarded by the UMD process.

FIG. 15 is a flow chart of a texture mapping update method 1500 in accordance with one embodiment of the present invention. In one embodiment, a command (e.g., embedded in the push buffer) or software method invokes a KMD paging update operation.

In block 1510, a determination is made that a paging update is desired for texture operations. In one embodiment, block 1510 is similar to block 1410.

In block 1520, a user mode driver (UMD) process is performed in which the UMD process puts a software command or method into a push buffer. In one embodiment, block 1520 is similar to block 1420. The command or method is recognized by the hardware and an interrupt is issued which invokes or calls a KMD process.

In block 1530, a kernel mode driver (KMD) process is performed in which the KMD process directs page table update operations in accordance with the information forwarded by the UMD process. In one embodiment, block 1530 is similar to block 1430. The KMD process causes the CPU to perform a page update operation. Once the page update operation is performed the KMD can release the CPU to process the next set of commands.

FIG. 16 is a flow chart of a texture mapping update method 1600 in accordance with one embodiment of the present invention. In one embodiment, a paging event is coerced or forced. In one exemplary implementation, a UMD coerces or forces a KMD to perform a page update operations. A paging event can be coerced or forced by locking a surface.

In block 1610, a determination is made that a paging update is desired for texture operations. In one embodiment, block 1610 is similar to block 1410.

In block 1620, a user mode driver (UMD) process is performed in which the UMD process inserts or changes allocation references in UMD command buffers. In one embodiment, block 1620 is similar to block 1420. For example, one or more allocations, which are otherwise unused, can be alternately locked (synchronized with GPU and mapped to CPU) and referenced by command buffers. In one embodiment, a GPU pointer to a surface is obtained and mapped into a CPU address space. A surface can also be locked by taking a proprietary format allocation (e.g., a format CPU does not understand, etc.) and converting it to a non-proprietary format allocation (e.g., a format CPU does understand, etc.) which in turn triggers a paging event (e.g., reformat and copy). If there is a surface allocation in one of the proprietary formats that is known to be resident in system memory, changing the proprietary surface can cause it to be deswizzled or evicted which triggers a paging event. The allocation can be a dummy allocation or set of dummy allocations that are not actually utilized for any other purpose. The set of dummy allocations can be referenced or utilized in a round robin scheme.

In block 1630, a kernel mode driver (KMD) process is performed in which the KMD process directs page update operations in response to the allocation reference changes in block 1620. In one embodiment, block 1630 is similar to block 1430. The various locking actions cause the OS to insert paging events at appropriate times in the scheduling queue. The appropriate times in the scheduling queue can leveraged (e.g., by the KMD, etc.) for updating page tables associated with sparse textures.

FIG. 17 is a flow chart of a texture mapping update method 1700 in accordance with one embodiment of the present invention. In one embodiment, texture mapping update method 1700 utilizes UMD page table update commands.

In block 1710, a determination is made that a paging update is desired for texture operations. In one embodiment, a residency feedback process indicates requested texture or tile information is not resident in memory.

In block 1720, a user mode driver (UMD) process is performed in which the UMD process includes forwarding page table update commands in its own command buffers. In one embodiment, block 1720 is similar to block 1420. The UMD receives updates periodically from the KMD and the UMD can utilize the latest mapping information the user mode driver has. In one embodiment, a user mode driver operation includes inserting memory objects known to not be resident in memory in an object list. The object list can include objects associated with other chunks of work. In embodiment, a UMD process includes receiving updated paging information in the user mode driver; utilizing the user mode driver to build the command buffer; submitting the command buffer information to a kernel mode driver.

In block 1730, a kernel mode driver (KMD) process is performed in which the KMD process performs a kernel mode driver page table update process. The kernel mode buffer can verify if the information has not changed before forwarding the command buffer information. When submitting a buffer, the KMD would verify that the information hasn't changed and if so submit the page table update portion of the command buffer. If the mapping has changed, the KMD skips submitting the page table updates. The KMD forwards the command buffer to hardware. Since mappings change without UMD knowledge only by OS-initiated paging events, the KMD can update page tables at those points.

FIG. 18 is a flow chart of a texture mapping update method 1500 in accordance with one embodiment of the present invention. In one embodiment, texture mapping update method 1800 utilizes a dedicated sparse texture TLB to translate from a texture address space to a virtual address space. A primary TLB can be utilized to translate from a virtual address space to a physical address space.

In block 1805 a dedicated sparse texture TLB is created. In one embodiment the dedicated sparse texture TLB provides a mapping between texture addresses and virtual addresses.

In block 1810, a determination is made that a paging update is desired for texture operations. In one embodiment, a residency feedback process indicates requested texture or tile information is not resident in memory.

In block 1820, a user mode driver (UMD) process is performed in which the dedicated sparse texture TLB is controlled by a UMD. In one embodiment, block 1820 is similar to block 1420. In one exemplary implementation the user mode driver process receives a texture address and utilizes the dedicated sparse texture TLB to obtain a corresponding virtual address. In one exemplary implementation a texture to virtual TLB is used directly by hardware. The texture unit performs both texture to virtual and virtual to physical translations when fetching data. The UMD can use dedicated hardware commands to update the texture to virtual TLB. In one example, since the target is virtual addresses, these updates are safe to do from user mode without kernel-mode oversight as they do not break inter-process protections. This facilitates implementation without KMD involvement requiring any updates to the virtual to physical mapping when changing sparse texture residency.

In block 1830, a kernel mode driver (KMD) process is performed in which the KMD process controls the primary TLB can be controlled by a KMD. In one embodiment, block 1830 is similar to block 1430. The primary TLB provides a mapping between virtual addresses and physical addresses. The KMD process causes the CPU to perform a page update operation. In one exemplary implemenation, the kernel mode driver notifies the user mode driver of any updates.

Thus the present systems and methods facilitate efficient and effective sparse texture operations.

Figure 19:
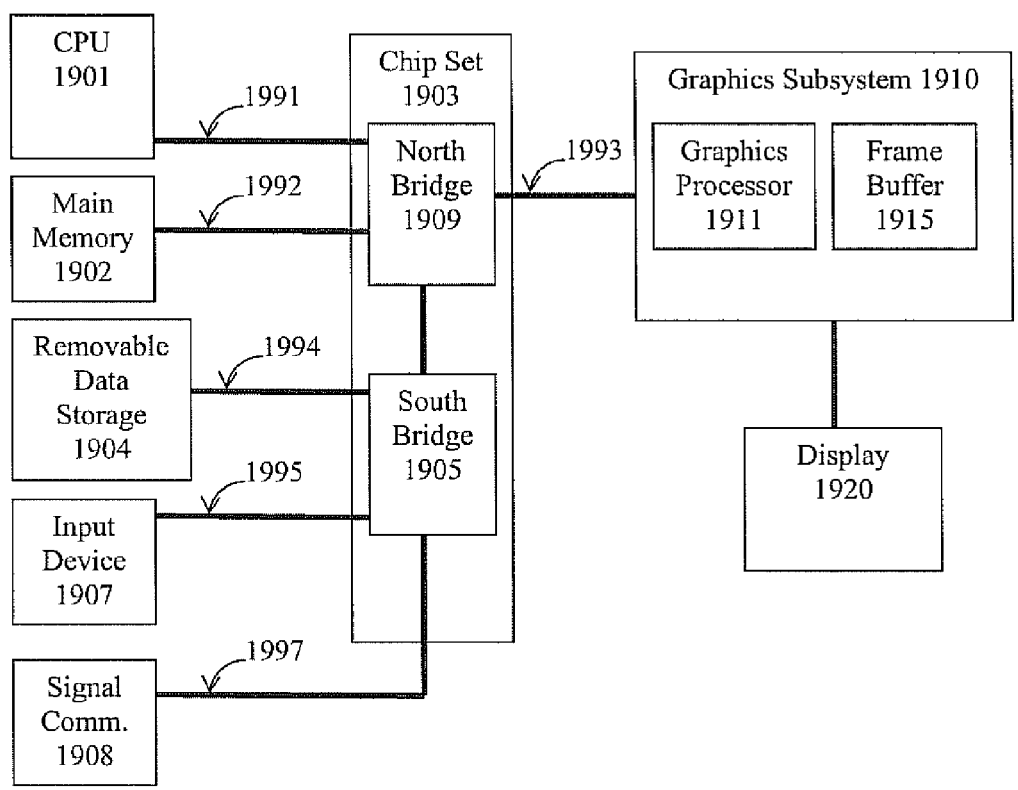
FIG. 19 is a block diagram of an exemplary computer system upon which embodiments of the present invention can be implemented.

FIG. 19 is a block diagram of an exemplary computer system 1900, one embodiment of a computer system upon which embodiments of the present invention can be implemented. Computer system 1900 includes central processor unit 1901, main memory 1902 (e.g., random access memory), chip set 1903 with north bridge 1909 and south bridge 1905, removable data storage device 1904, input device 1907, signal communications port 1908, and graphics subsystem 1910 which is coupled to display 1920. Computer system 1900 includes several busses for communicatively coupling the components of computer system 1900. Communication bus 1991 (e.g., a front side bus) couples north bridge 1909 of chipset 1903 to central processor unit 1901. Communication bus 1992 (e.g., a main memory bus) couples north bridge 1909 of chipset 1903 to main memory 1902. Communication bus 1993 (e.g., the Advanced Graphics Port interface) couples north bridge of chipset 1503 to graphic subsystem 1510. Communication buses 1994, 1995 and 1997 (e.g., a PCI bus) couple south bridge 1905 of chip set 1903 to removable data storage device 1904, input device 1907, signal communications port 1908 respectively. Graphics subsystem 1910 includes graphics processor 1911 and frame buffer 1915.

The components of computer system 1900 cooperatively operate to provide versatile functionality and performance. In one exemplary implementation, the components of computer system 1900 cooperatively operate to provide efficient and effective protection of content presentation on an internal display. Communications bus 1991, 1992, 1993, 1994, 1995 and 1997 communicate information. Central processor 1901 processes information. Main memory 1902 stores information and instructions for the central processor 1901. Removable data storage device 1904 also stores information and instructions (e.g., functioning as a large information reservoir). Input device 1907 provides a mechanism for inputting information and/or for pointing to or highlighting information on display 1920. Signal communication port 1908 provides a communication interface to exterior devices (e.g., an interface with a network). Display device 1920 displays information in accordance with data stored in frame buffer 1915. In one exemplary implementation display device 1920 is an internal display. Computer system 1900 can also have an additional external display (not shown). Graphics processor 1911 processes graphics commands from central processor 1901 and provides the resulting data to frame buffer 1915 for storage and retrieval by display monitor 1920.

It is appreciated that the present invention can be implemented in a variety of embodiments. In one exemplary implementation the present invention can be included in processing systems utilized to provide a variety of graphics applications including video games. For example, the present invention can be utilized to facilitate virtual address to physical address translations in a game console, personal computer, personal digital assistant, cell phone or any number of platforms. It is also appreciated that references to video game application implementations are exemplary and the present invention is not limited to these implementations.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowcharts of the figures herein, and in a sequences other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in modulated data signals such as carrier waves or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

Furthermore, while embodiments described herein may make reference to a GPU, it is to be understood that the circuits and/or functionality described herein could also be implemented in other types of processors, such as general-purpose or other special-purpose coprocessors, or within a CPU. Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A texture unit comprising:
    an instruction input component for receiving texture instructions and texture coordinates;
    a level of detail component for determining a level of detail for performing said instructions at said texture coordinates, wherein said level of detail component weighs residency of texture information in determining said level of detail;
    a texture determination component for calculating an address of a texture corresponding to said level of detail determined by said level of detail component and fetching said texture; and
    a texture filter component for filtering said texture and forwarding a result.

2. A texture unit of claim 1 wherein said level of detail component determines a clamp for said level of detail.

3. A texture unit of claim 2 wherein said level of detail component utilizes a finest LOD as a minimum LOD clamp on said level of detail.

4. A texture unit of claim 1 wherein said level of detail component utilizes a sparse texture residency translation map.

5. A texture unit of claim 1 wherein said level of detail component utilizes a sparse texture residency translation map to indicate a minimum resident LOD.

6. A texture unit of claim 1 texture unit of claim wherein a finest LOD number indicates said minimum resident LOD and a sparse texture residency translation map includes one finest LOD number per tile of a sparse texture.

7. A texture unit of claim 1 further comprising a non-resident requested tiles tracking component for tracking tiles that are requested but non-resident.

8. A texture unit of claim 1 wherein said texture filter component includes a maximum filter component for performing maximum with accumulate operations.

9. A texture unit comprising:
    a level of detail component for determining a level of detail for performing texture instructions;
    a texture determination component for calculating an address of a texture corresponding to said level of detail determined by said level of detail component and fetching said texture;
    a non-resident requested tiles tracking component for tracking tiles that are requested but non-resident; and
    a texture filter component for filtering said texture and forwarding a result.

10. A texture unit of claim 9 wherein said non-resident requested tiles tracking component includes a cache.

11. A texture unit of claim 10 wherein said cache is included in a read modify write path associated with said texture unit.

12. A texture unit of claim 10 wherein said non-resident requested tiles tracking component includes an OR component for performing an atomic OR operation for coalescing cached values from multiple texture pipe components.

13. A texture unit of claim 11 wherein said atomic OR is performed when evicting textel information out of memory.

14. A texture unit of claim 8 wherein said non-resident requested tiles tracking component tracks tiles that would have been used if a minimum LOD clamp is not utilized.

15. A texture unit of claim 8 wherein said non-resident requested tiles tracking component tracks said tiles utilizing a usage feedback map that includes one bit per tile, wherein said bit indicates whether said tile would have been touched by a texture lookup if a LOD clamp is not utilized in said level of detail component.

16. A texture unit of claim 8 wherein said non-resident requested tiles tracking component utilizes a usage feedback map.

17. A graphics processing system comprising:
    a shader component for performing shading operations; and
    a texture unit for performing sparse texture operations utilizing a sparse texture residency translation map, wherein a probe process is utilizing said sparse texture residency translation map information to return a finest LOD that contains the texels for a texture lookup operation.

18. A graphics processing system of claim 17 wherein said texture unit determines a clamp on a level of detail based upon said sparse texture residency translation map.

19. A graphics processing system of claim 17 wherein said texture unit performs a texture lookup in said sparse texture residency translation map.

20. A graphics processing system of claim 17 wherein said texture unit utilizes a usage feedback map.

* * * * *